Sept. 5, 1944.  W. C. KLEINFELDER  2,357,591
JOINT FOR METAL SHEATH CABLES
Filed May 1, 1942

INVENTOR
W. C. KLEINFELDER
BY J. MacDonald
ATTORNEY

Patented Sept. 5, 1944

2,357,591

UNITED STATES PATENT OFFICE 2,357,591

JOINT FOR METAL SHEATH CABLES

Walter C. Kleinfelder, Summit, N. J., assignor to Bell Telephone Laboratories, Incorporated, New York, N. Y., a corporation of New York Application May 1, 1942, Serial No. 441,333

7 Claims. (Cl. 174—84)

This invention relates to cable splices and more particularly to joints in metal sheath multiconductor cables in which a metallic sleeve is secured in position over the conductor splice.

It is the object of this invention to provide a joint for metal sheath cable which entirely eliminates the use of solder.

Another object of this invention is the provision of a joint for cable which eliminates the use of a heated material for producing the joint.

A further object of this invention is to provide a gas-tight joint for metal sheath cable which can be applied with a minimum amount of time and labor.

In the present type of sleeve joint for lead sheath cable, the metallic sleeve is positioned over the conductor splice and the ends thereof are beaten down until they contact the sheath of the cable; molten solder is then applied to each end of the sleeve and wiped therearound to form a tight joint.

With this type of joint a large quantity of solder containing a substantial amount of tin is used and it is the purpose of this invention to provide a joint which will eliminate or considerably reduce the use of this material.

In accordance with the preferred form of this invention, I seal each end of the metal protective sleeve, which is in position over the conductor splice, by means of bushings of resilient material, confined between metal reenforcing washers, one on each side thereof to prevent cold flow of the bushings under sustained pressure and to prevent the deleterious effects of atmosphere and sunlight. Pressure applied to the exterior of the sleeve causes depressions or deformations to be made therein which squeeze the bushings into intimate contact with the outside of the cable sheath and the interior of the sleeve to form a gas-tight joint therebetween.

Figure 1:
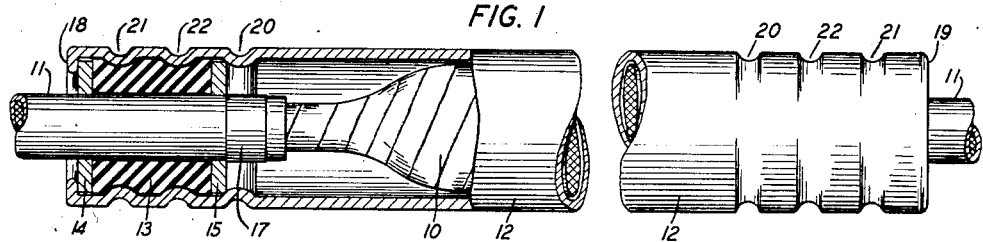
Fig. 1 is a foreshortened view partly in section of the joint of this invention applied to a fragment of lead sheath cable.

In the proposed form of my invention, as shown on the accompanying drawing, there is positioned over the splice 10, of the cable 11, a metal protective sleeve 12. This sleeve completely encloses the splice 10 and is sealed at each end by means of a resilient bushing 13 which embraces the outer wall or sheath of the cable 11 and the inner wall of the sleeve 12. Metal reenforcing washers 14 and 15 are provided on each side of the bushing 13 and in contact therewith and wrappings of tape 16 and 17 or any other suitable material are placed on each side of the washers 14 and 15 to prevent movement of the respective parts.

Figure 3:
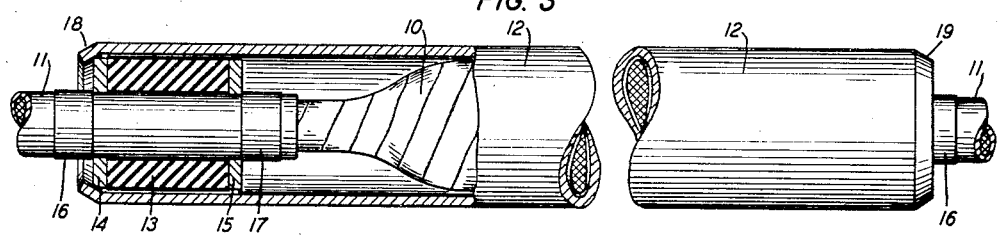
Fig. 3 illustrates the second step and is a view similar to Fig. 2 except that the sleeve has been placed over the splice and the ends thereof beaten over slightly to prevent movement thereof.
Figure 4:
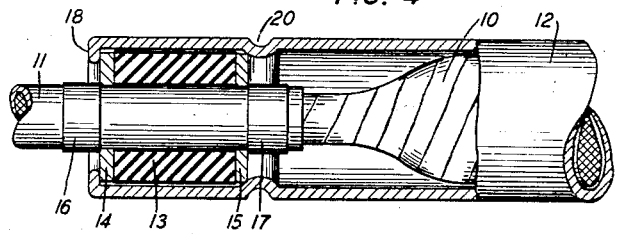
Fig. 4 is the third step and is a fragmentary view of one end of the joint, partly in section, with a constriction formed in the sleeve and bearing against the metal washer to confine the resilient bushing between the beaten-over end of the sleeve and said washer.

As shown in Figs. 1, 3 and 4, the ends 18 and 19 of the sleeve 12 are beaten over to maintain the sleeve in position while the subsequent operations on the sleeve are performed.

Constrictions 20 as shown in Figs. 1 and 4 are formed on each end of the sleeve 12 adjacent the inner washers 13. These deformations or constrictions may be made by any suitable tool (not shown) and serve to confine the bushings 13 between the washers 14 and 15 and prevent movement thereof.

As shown in Fig. 1, two additional constrictions or deformations 21 and 22 are formed on each end of the sleeve 12, directly over the bushings 13, thereby compressing the bushings in such a manner that an intimate contact is provided between the center bore of the bushings 13 and the sheath of the cable 11 and the outer surface of the bushings 13 and the inner surface of the sleeve 12.

In constructing the improved joint of this invention, the first step is to slide the metal protective sleeve 12 over one end of the cable to be joined. This sleeve is slid back on the cable some distance from the end to provide freedom of movement for the subsequent operations. After the sleeve 12 is positioned on the cable, the next step is to place on each end of the cable the bushings 13 and the washers 14 and 15. These are so placed that the bushings 13 are located between the metallic washers with the washers in contact with the ends of the bushings. After the washers and bushings are placed on the cable and pushed back from the ends thereof, the conductors of the cable 11 are spliced together in the usual manner as shown at 10.

Figure 2:
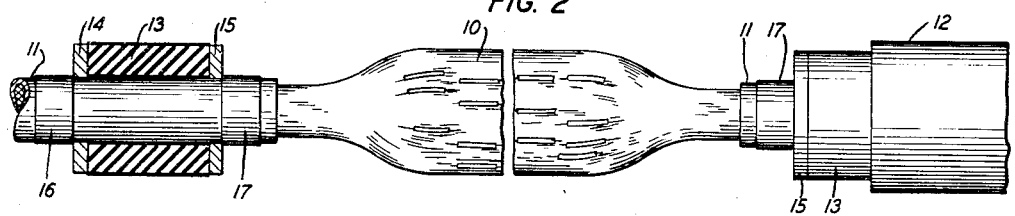
Fig. 2 is a foreshortened view of the first step in the application of the joint of this invention and shows the resilient bushings in place on each side of the splice embraced by the metal washers and held in position by means of a tape, with the sleeve ready to be slipped thereover.

After the conductors of the cable 11 are spliced together and wrapped as shown in Figs. 1, 3 and 4, the washers 14 and 15 and the bushings 13 are positioned on the cable and so spaced apart that the lead sleeve 12 will extend about ¼ inch beyond the outer faces of the washers at each end. Wrappings of friction tape 16 and 17, or the like are wrapped around the cable sheath 11 on each side of the end assemblies to prevent movement thereof, as shown in Fig. 2.

After the above operations are completed on each side of the splice 10, the sleeve 12 is slid over the bushings and washers and the ends of the sleeve are beaten over slightly as shown at 18 and 19 in Fig. 3. This beating-over serves to hold the sleeve in position by acting as a stop for the washers 14, as shown in Fig. 3.

The next step is to apply the constrictions or deformations 20 to the metal sleeve 12 adjacent the washers 15 so that the pressure of the constrictions will bear against the washers and force the bushings 13 against the washers 14 which in turn will bear against the beaten-over portion or lips 18 and 19 which now may be beaten all the way over as shown in Fig. 4.

The final step is to apply the additional constrictions or deformations 21 and 22 to the sleeve 12 as shown in Fig. 1. These constrictions are applied directly over the bushings 13 and the pressure exerted thereon causes the bushings to be forced into intimate contact both with the sheath of the cable 11 and the inner wall of the sleeve 12, thereby providing a gas-tight joint. After the required number of constrictions are made in the sleeve, the joint is complete and the tapes 16 may be removed if desired.

If desired, that portion of the outer surface of the cable sheath 11 and the inner surface of the sleeve 12, which is in contact with the bushing 13, may be coated with a suitable adhesive.

While I have shown and described the preferred form of my invention, it is to be understood that various changes and modifications may be made therein without departing from the spirit of the invention; for example, I do not intend to limit myself to the number or the shape of the constrictions or deformations in the sleeve, neither do I limit myself to any specific material for the bushings and I am only limited by the scope of the appended claims.

What is claimed is:

1. A joint for metal sheath cables comprising a cable splice, a metal sleeve positioned over said splice, resilient bushings positioned at each end of said sleeve and surrounding said cable and a plurality of deformations in said sleeve adjacent said bushings for forcing said bushings into intimate contact with said cable and said sleeve to provide a gas-tight joint therebetween.

2. A joint for metal sheath cables comprising a cable splice, a metal sleeve positioned over said splice, washers on said cable positioned in each end of said sleeve, resilient bushings abutting said washers and surrounding said cable and a plurality of deformations in said sleeve adjacent said bushings for forcing said bushings into intimate contact with said cable and said sleeve to provide a gas-tight joint therebetween.

3. A joint for metal sheath cables, comprising a cable splice, a metal sleeve positioned over said splice, metal washers on said cable positioned in each end of said sleeve, resilient bushings confined between said washers and surrounding said cable and a plurality of deformations in said sleeve adjacent said bushings for forcing said bushings into intimate contact with said cable and said sleeve to provide a gas-tight joint therebetween.

4. A joint for metal sheath cables, comprising a cable splice, a metal sleeve positioned over said splice, metal washers on said cable positioned in each end of said sleeve, resilient bushings confined between said washers and surrounding said cable and a plurality of circumferential grooves in said sleeve adjacent said bushings for forcing said bushings into intimate contact with said cable and said sleeve to provide a gas-tight joint therebetween.

5. A joint for metal sheath cables, comprising a cable splice, a metal sleeve positioned over said splice, washers on said cable positioned in each end of said sleeve, means on said cable for preventing displacement of said washers, resilient bushings abutting said washers and surrounding said cable and a plurality of circumferential grooves in said sleeve adjacent said bushings for forcing said bushings into intimate contact with said cable and said sleeve to provide a gas-tight joint therebetween.

6. A joint for metal sheath cables comprising a metal sleeve positioned over said splice, metal washers on said cable positioned in each end of said sleeve, resilient bushings confined between said washers and surrounding said cable, and means on said cable for preventing displacement of said washers and a plurality of circumferential grooves in said sleeve adjacent said bushings for forcing said bushings into intimate contact with said cable to provide a gas-tight joint therebetween.

7. A joint for metal sheath cables comprising a cable splice, a metal sleeve positioned over said splice, washers on said cable positioned in each end of said sleeve, means on the end of said sleeve for preventing displacement of said washers, resilient bushings confined between said washers and surrounding said cable, and a plurality of deformations in said sleeve adjacent said bushings for forcing said bushings into intimate contact with said cable and said sleeve to provide a gas-tight joint.

WALTER C. KLEINFELDER.